United States Patent
Canedo Pardo et al.

(10) Patent No.: US 11,519,392 B2
(45) Date of Patent: Dec. 6, 2022

(54) ROLLER PITCH BEARINGS

(71) Applicant: General Electric Renovables España, S.L., Barcelona (ES)

(72) Inventors: Santiago Canedo Pardo, Barcelona (ES); Javier Bescos Grillo, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 16/945,883

(22) Filed: Aug. 2, 2020

(65) Prior Publication Data
US 2021/0033076 A1   Feb. 4, 2021

(30) Foreign Application Priority Data
Aug. 2, 2019  (EP) .................................... 19382677

(51) Int. Cl.
*F03D 1/06* (2006.01)
*F03D 80/70* (2016.01)

(52) U.S. Cl.
CPC ........... *F03D 80/70* (2016.05); *F03D 1/0658* (2013.01); *F05B 2260/79* (2013.01); *F16C 2360/31* (2013.01)

(58) Field of Classification Search
CPC ...... F03D 80/70; F03D 1/0658; F16C 19/381; F16C 2360/31
See application file for complete search history.

(56) References Cited

U.S. PATENT DOCUMENTS

| | | | | |
|---|---|---|---|---|
| 9,605,709 B2* | 3/2017 | Kaesler | ................. | F16C 19/505 |
| 9,879,656 B2* | 1/2018 | Schroppel | ............... | F16C 19/28 |
| 10,451,106 B2* | 10/2019 | Sauter | ..................... | F16C 17/10 |
| 10,683,890 B2* | 6/2020 | Barciet | .................... | F16C 19/28 |
| 2019/0136910 A1* | 5/2019 | Catalano | ............... | F16C 33/363 |

FOREIGN PATENT DOCUMENTS

| | | |
|---|---|---|
| DE | 10 2013 100679 A1 | 7/2014 |
| DE | 20 2015 006588 U1 | 12/2016 |
| WO | WO 2008/058729 A1 | 5/2008 |

OTHER PUBLICATIONS

EPO Search Report, dated Jan. 30, 2020.

* cited by examiner

*Primary Examiner* — Justin D Seabe
(74) *Attorney, Agent, or Firm* — Dority & Manning, P.A.

(57) ABSTRACT

In a first aspect, a roller pitch bearing for a wind turbine is provided. The roller pitch bearing comprises a first bearing component and a second bearing component, the first bearing component being configured to rotate with respect to the second bearing component; wherein one of the first and the second bearing components is configured to be coupled to a wind turbine blade and the other one of the first and the second bearing components is configured to be coupled to a rotor hub of a wind turbine. The roller pitch bearing further a limiting structure attached to the first bearing component, the limiting structure radially extending from the first bearing component towards the second bearing component to limit a radial movement between the bearing components. In further aspect, a rotor for a wind turbine comprising a roller pitch bearing is provided.

21 Claims, 6 Drawing Sheets

ROLLER PITCH BEARINGS

The present disclosure relates to roller pitch bearings with a limiting structure and rotors for wind turbines having these roller pitch bearings.

BACKGROUND

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower.

An auxiliary system generally provided on wind turbines is the pitch system. Pitch systems are employed for adapting the position of a wind turbine blade to varying wind conditions. A pitch system normally comprises a pitch bearing comprising an outer ring, an inner ring and, between these two rings, one or more rows of rolling elements which allow both rings to rotate relative to each other. A wind turbine blade may be attached either at the inner ring or at the outer ring, whereas the hub is connected at the other. A blade may perform a relative rotational movement with respect to the hub when a pitch system is actuated. The bearing inner ring may therefore perform a rotational movement with respect to the bearing outer ring.

Pitch bearings may generally be actuated mechanically or hydraulically. In mechanical pitch systems, a drive pinion may mesh with an annular gear provided on the inner or the outer ring to set the wind turbine blade into rotation.

The rolling elements, e.g. balls or rollers, may be arranged between an inner race of the inner ring and an outer race the outer ring for reducing the friction between these rings. Depending on the type of rolling elements, the pitch bearing may be for example a ball bearing or a roller bearing.

The rolling elements of ball bearings are balls that rotates between the inner race and the outer race. These balls contact each race in a relatively narrow area. Accordingly, loads acting on the balls may involve a high pressure. This may cause a deformation of the balls subjected to relatively high loads. Increasing the size of the balls may reduce the deformation caused by the pressure exerted by the races of the rings on the balls. However, larger balls may involve higher manufacturing costs.

In roller bearings, the rolling elements arranged between the races have a generally cylindrical or conical shape. Rolling elements of these types are generally called rollers. Roller bearings may be more cost-effective than ball bearings, in particular, if compared to ball bearings having relatively large balls. The contact area between the races and the rollers is larger than in ball bearings. Accordingly, roller bearings may withstand higher loads in a direction perpendicular to the rotational axis of the roller than ball bearings.

Pitch roller bearings may be used instead of pitch ball bearings when high loads acting on the blades are expected, e.g. in large blades. Pitch roller bearings may generally comprise one or more rows of axial rollers arranged between the inner and the outer ring. These axial rollers may withstand higher axial loads, e.g. weight of the blade, than balls. Pitch roller bearings may also comprise radial rollers arranged between the inner and the outer ring. These radial rollers may limit the movement of inner ring towards the outer ring. However, these radial rollers do not generally prevent separating the inner ring from the outer ring.

Pitch bearings may suffer oscillations or deformations when blades are subjected to relatively high winds. These oscillations or deformations may cause the inner ring to locally move towards a center of the rings and the rollers and the rings may skid or may be misaligned.

In operation, the blade may be maintained in predefined "below rated pitch position", i.e. a default pitch position, at wind speeds equal to or below nominal wind speed. Said default pitch position may generally be close to a 0° pitch angle. Local movements of the inner ring towards the center of the rings when the blade is in its default position may cause wearing of the bearing components.

Preloading the radial rollers or increasing the size of the rings may reduce such a local separation of the inner ring from the outer ring. However, these solutions increase the weight of the pitch bearing and the manufacturing cost.

The present disclosure provides examples of systems and methods that at least partially resolve some of the aforementioned disadvantages.

SUMMARY

In a first aspect, a roller pitch bearing for a wind turbine is provided. The roller pitch bearing comprises a first bearing component and a second bearing component, the first bearing component being configured to rotate with respect to the second bearing component. One of the first and the second bearing components is configured to be coupled to a wind turbine blade and the other one of the first and the second bearing components is configured to be coupled to a rotor hub of a wind turbine. The roller pitch bearing also comprises one or more rows of rollers arranged between the first and the second bearing component. In addition, the roller pitch bearing comprises a limiting structure attached to the first bearing component. The limiting structure radially extends from the first bearing component towards the second bearing component. The limiting structure further comprises an engaging portion engaging with an engaging portion of the second bearing component to limit a radial movement between the bearing components.

According to this aspect, as the engaging portion of the limiting structure fits or engages with the engaging portion of the second structure and the limiting structure is attached to the first bearing component, radial movements between the bearing components are limited. The limiting structure limits a radial movement between the first and the second bearing components. Separation of the bearing components may thus be prevented. Accordingly, the roller pitch bearing may withstand high radial loads, and consequently high wind loads, in a simple and cost-effective manner.

In a further aspect, a roller pitch bearing for a wind turbine is provided. The roller pitch bearing comprises a first bearing component to be coupled to a wind turbine blade and a second bearing component to be coupled to rotor hub of a wind turbine blade. The second bearing component comprises a protrusion. The roller pitch bearing further comprises one or more rows of rollers arranged between the first and the second bearing components in such a way that the first bearing component is configured to rotate with respect to the second bearing component. In addition, the roller pitch bearing comprises a limiting structure attached to the first bearing component. The limiting structure radially extends from the first bearing component towards the second bearing component. The limiting structure comprises a receptacle engaging with the protrusion of the first bearing component.

According to this aspect, radial movements of the first bearing component with respect to the second bearing component may be limited by the limiting structure. The limiting structure may thus be radially retained by the second bearing component and radial movements of the first bearing component with respect to the second bearing component may be minimized. Similar to the first aspect, a simple and a cost-effective pitch roller bearing capable of withstand high radial loads may be provided.

In yet a further aspect, a rotor for a wind turbine is provided. The rotor for a wind turbine comprises a rotor hub, a wind turbine blade and a roller pitch bearing rotatably connecting the wind turbine blade to the rotor hub. The roller pitch bearing comprises a first bearing component and a second bearing component, the first bearing component being configured to rotate with respect to the second bearing component. One of the first and the second bearing components is coupled to the wind turbine blade and the other one of the first and the second bearing components is coupled to the rotor hub. The roller pitch bearing further comprises one or more rows of rollers arranged between the first and the second bearing components. In addition, the pitch roller bearing comprises a limiting structure attached to the first bearing component. The limiting structure radially extends from the first bearing component towards the second bearing component. The limiting structure comprises an engaging portion engaging with an engaging portion of the second bearing component to limit a radial movement between the bearing components.

Advantages derived from this aspect may be similar to those mentioned regarding the previous aspects.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
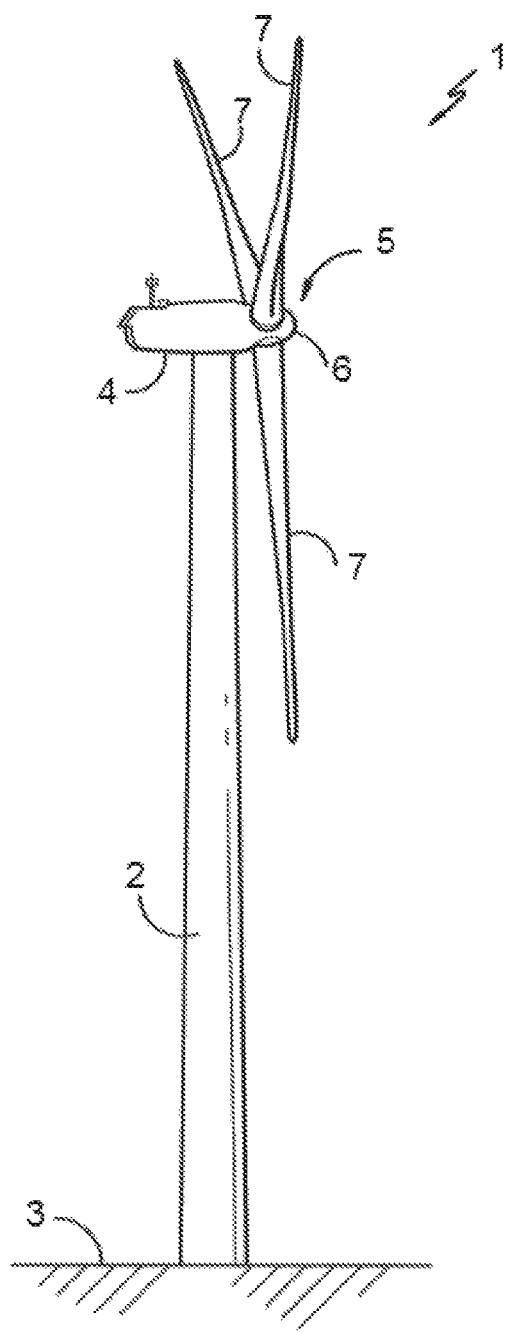
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced.

Figure 2:
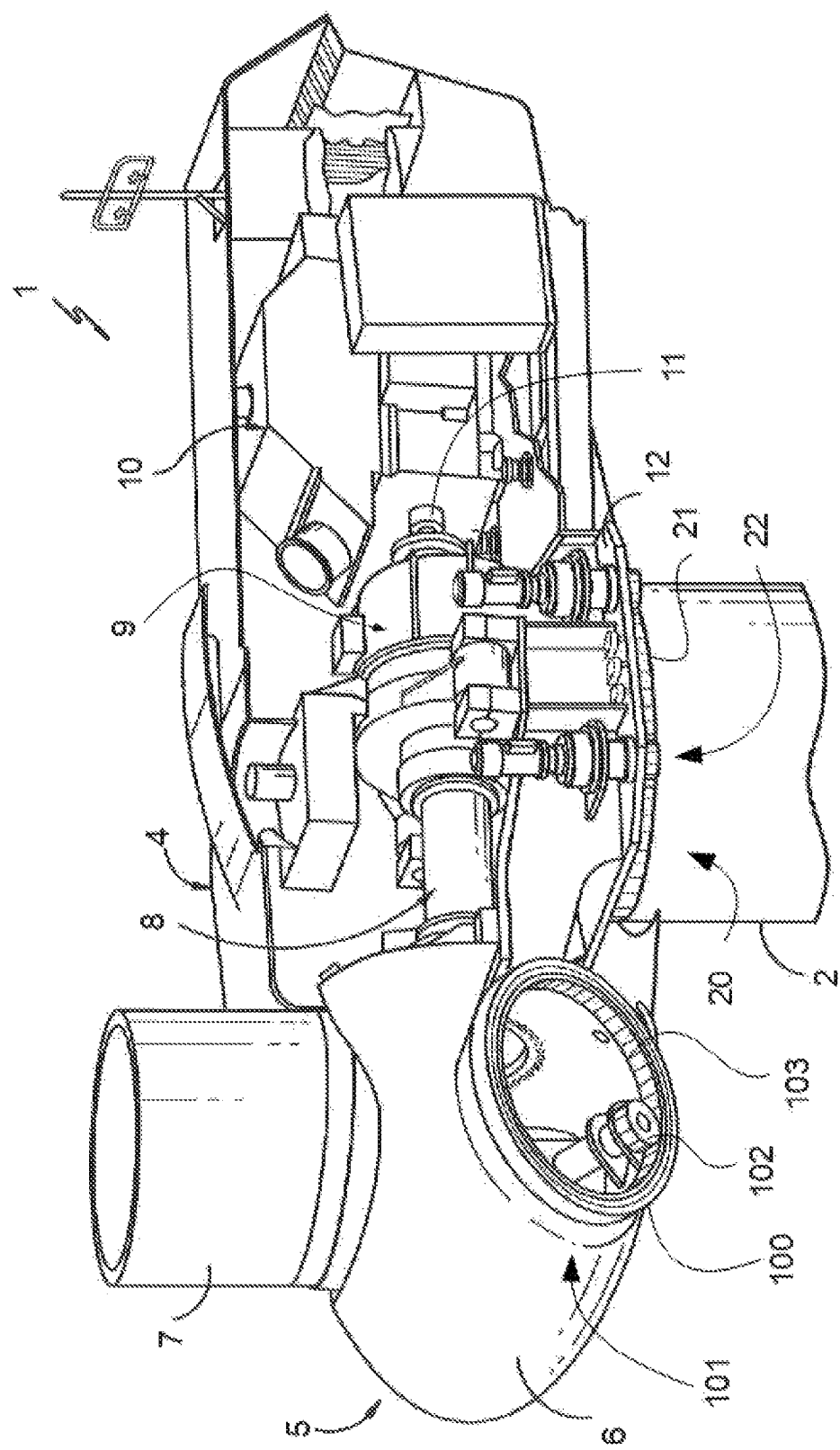
FIG. 2 illustrates a simplified, internal view of a nacelle of a wind turbine according to one example.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 5 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9.

It should be appreciated that the rotor shaft 8, gearbox 9, and generator 10 may generally be supported within the nacelle 4 by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor, a gearbox and a pinion for meshing with the annular gear for rotating one of the bearing components with respect to the other.

Blades 7 are coupled to the hub 6 with a pitch bearing 100 in between the blade 7 and the hub 6. The pitch bearing 100 comprises an inner ring and an outer ring (shown in FIG. 3). A wind turbine blade may be attached either at the inner bearing ring or at the outer bearing ring, whereas the hub is connected at the other. A blade 7 may perform a relative rotational movement with respect to the hub 6 when a pitch system 101 is actuated. The inner bearing ring may therefore perform a rotational movement with respect to the outer bearing ring. The pitch system 101 of FIG. 2 comprises a pinion 102 that mesh with an annular gear 103 provided on the inner bearing ring to set the wind turbine blade into rotation.

Figure 3:
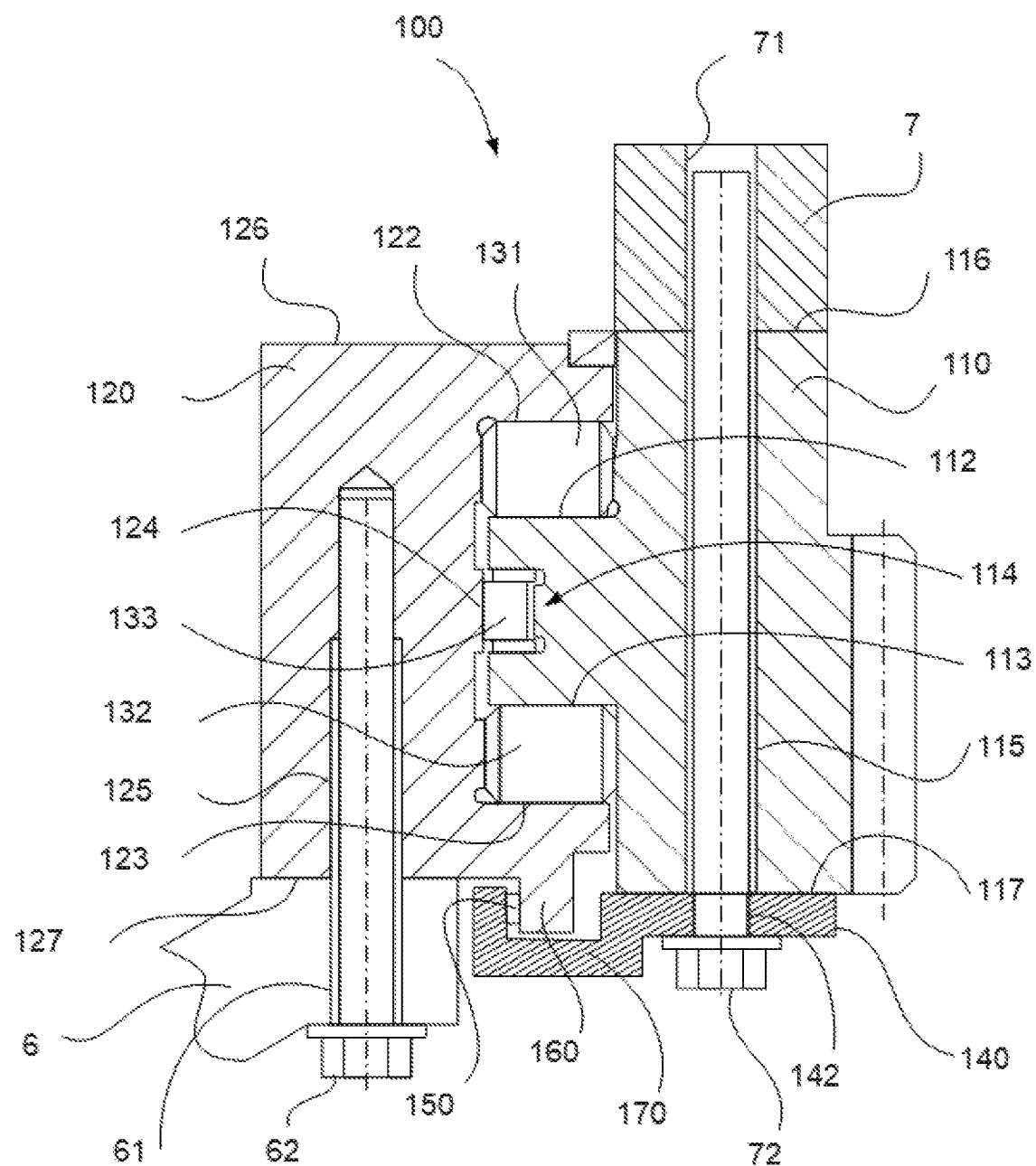
FIG. 3 shows a cross-sectional view of a portion of a roller pitch bearing for a wind turbine according to one example of the present disclosure.

FIG. 3 shows a cross-sectional view of a portion of a roller pitch bearing for a wind turbine according to one example of the present disclosure. The roller pitch bearing 100 of this figure comprises a first bearing component 110 and a second bearing component 120. The first bearing component 110 is configured to rotate with respect to the second bearing component 120.

In this example the first bearing component 110 is an inner ring and the second bearing component 120 is an outer ring. The first bearing component may thus be placed in a radially inner side and the second bearing component in a radially outer side of the roller pitch bearing. However, in other examples, the first bearing component may be the outer ring and the second bearing component the inner ring.

The roller pitch bearing 100 of this figure comprises a limiting structure 140 attached to the first bearing component 110. The limiting structure 140 extends from the first bearing component 110 towards the second bearing component 120. The limiting structure 140 comprises an engaging portion which engages with an engaging portion of the second bearing component. In this example, the engaging portion of the limiting structure is a receptacle 170 and the engaging portion of the second bearing component is a protrusion 160. Radial movements of the first bearing component 110 with respect to the second bearing component may thus be limited. The limiting structure may thus prevent the separation of the first bearing component from the second bearing component.

In this disclosure a limiting structure attached to the first bearing component may comprise a limiting structure integrally formed with the first bearing component, a limiting structure directly attached to the first bearing component or a limiting structure attached to the first bearing component through an intermediate connector.

In this example, the first bearing component 110 is coupled to the blade 7 and the second bearing component 120 is coupled to the rotor hub 6. Accordingly, the first bearing component is configured to be coupled to a wind turbine blade and the second bearing component is configured to be coupled to a rotor hub of a wind turbine. In other examples, the first bearing component may be coupled or configured to be coupled to a rotor hub and the second bearing component may be coupled or configured to be coupled to a wind turbine blade.

In FIG. 3, the rotor hub comprises a hole 61. A fastener 62, e.g. a bolt, may pass through this hole 61 and may be secured, e.g. threaded, in a threaded hole 125 of the second bearing component 120. The fastener 62 may thus connect the rotor hub 6 to the second bearing component 120. A plurality of fasteners may be threaded in a plurality of holes along the circumference of the roller pitch bearing. In other examples, the rotor hub and the second bearing component may comprise a plurality of through holes. Bolts may be inserted into these through holes and secured with nuts to connect the second bearing component to the hub.

The blade of FIG. 3 comprises a receiver 71 to secure a bolt 72. The receiver 71 may be for example an insert with an inner thread or a T-bolt connector. The first bearing component 110 of this figure comprises a through hole 115. A bolt 72 may pass through the hole 115 and may be secured to the receiver 71 to connect the blade 7 to the first bearing component 110. In this example, the limiting structure 140 comprises a hole 140. The bolt 72 passes through the hole 142 of the limiting structure 140 to connect the limiting structure 140 to the first bearing component 110. In this example, the limiting structure is bolted to the first bearing component through the bolt 72 which connects the first bearing component 110. A plurality of bolts may be distributed along the circumference of the first bearing component to connect the roller pitch bearing to the blade.

In other examples, the limiting structure 140 may be connected to first bearing component 110 through additional fasteners or through other suitable connection methods, e.g. welding.

The first bearing component 110 may comprise an upper side 116 and a lower side 117. These sides may be parallel to each other. Similarly, the second bearing component may comprise an upper 126 and a lower 127 side. In the example of FIG. 3, the upper sides 116 and 126 face the wind turbine blade 7 and the lower sides 117 and 127 faces the rotor hub 6. In this example, the limiting structure 140 is attached to the lower side 117 of the first bearing component 110. However, in other examples, the limiting structure may be attached to the upper side 116 of the first bearing component 110.

In some examples, the roller pitch bearing may comprise one limiting structure arranged at the lower side of the first bearing component and another limiting structure arranged at the upper side of the first bearing component.

In some examples, the limiting structure may be substantially disc-shaped. The limiting structure may thus extend along the whole circumference of the pitch roller bearing. In some of these examples, the receptacle may extend along at least a portion of a circumference of the limiting structure. For example, the receptacle may extend along the whole circumference of the limiting structure.

In other examples, the limiting structure may extend along a portion of the circumference of the pitch roller bearing. In some of these examples, the limiting structure may comprise one or more limiting elements. These limiting elements may be arranged spaced apart from each other.

Between the first bearing component 110 and the second bearing 120 one or more row of rollers may be arranged. In FIG. 3, the roller pitch bearing comprises an upper row of rollers 131 and a lower row of rollers 132. These rows of rollers may comprise a plurality of rollers distributed along the circumference of the roller pitch bearing 100. The rollers of the upper and lower rows of rollers of this figure are axial rollers. These axials rollers may be configured to withstand axial loads acting on the pitch roller bearing.

The axial rollers of this figure are substantially cylindrical. In other examples, the axial rollers may be substantially conical. The axial rollers of this example can rotate about an axis. This axis may substantially correspond to a radius of the roller pitch bearing. In this figure, the upper rollers are sandwiched between an upper rolling surface 122 of the second bearing component 120 and an upper rolling surface 112 of the first bearing component 110. The lower rollers may also be sandwiched between a lower rolling surface 123 of the second bearing component and a lower rolling surface 113 of the first bearing component 110. In this example, the rolling surfaces of the second bearing component 120 surrounds the rolling surfaces of the first bearing components. In other examples, the rolling surfaces of the second bearing component may be arranged inside a space defined between the rolling surfaces of the first bearing component 110.

The roller pitch bearing of this figure also comprises a plurality of radial rollers 133 between the bearing components. The radial rollers 133 may rotate about an axial axis. This axial axis may be substantially parallel to an axis of rotation of the blade. The radial rollers may be for example cylindrical. In this example, the radial rollers prevent radial movements of the first bearing component towards the second bearing component.

In this figure, the radial rollers 133 are partially enclosed in a groove 114 of the first bearing component. The groove 114 may hold the radial rollers 133. The radial rollers 133 are sandwiched between a central rolling surface 124 of the second bearing component 120 and the groove 114. In other examples, the groove holding radial rollers may be arranged at second bearing component.

The roller pitch bearing 100 of this example comprises one or more gliding pads 150 arranged between the engaging portion of the limiting structure and the engaging portion of the second bearing component. Gliding pads may prevent a direct contact between the engaging portions. In this example, the gliding pad 150 may prevent a direct contact between the protrusion 160 and the receptacle 170. In some examples, several gliding pads may be arranged along the circumference of roller pitch bearing. The gliding pad may be attached to the protrusion or to the receptacle.

Figure 4:
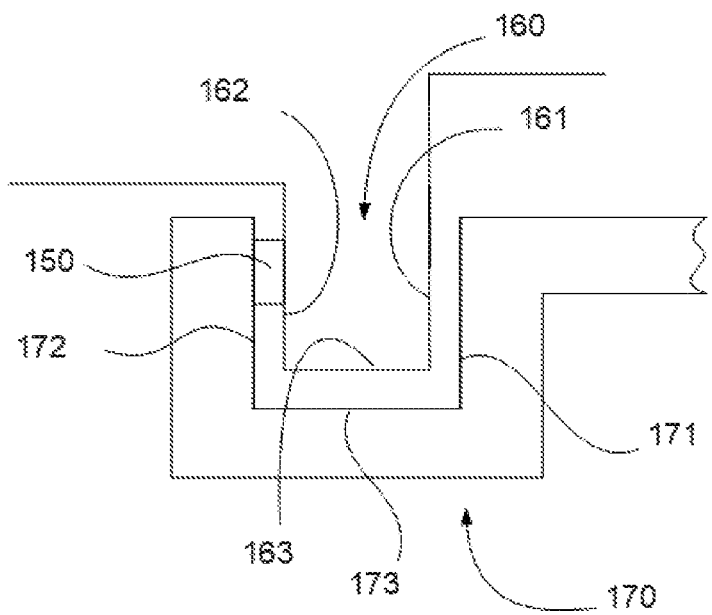
FIG. 4 is a zoomed-in view of the engaging portions of FIG. 3.

FIG. 4 is a zoomed-in view of the engaging portions of FIG. 3. The protrusion 160 substantially engages with the receptacle 170. The protrusion 160 may have a shape corresponding to a shape of the receptacle 170. In this example, the receptacle 170 partially encloses the protrusion 160. The receptacle 170 may have a substantially U-shape to receive the protrusion 160.

The protrusion 160 of this figure comprises an inner 161 and an outer 162 sidewall. The inner sidewall 161 may be substantially parallel to the outer sidewall 162. A bottom surface 163 may connect the inner sidewall 161 to the outer sidewall 162. Similarly, the receptacle 170 may comprise an inner sidewall 171 and an outer sidewall 172. The receptacle 170 may further comprise a bottom surface 173 connecting the inner sidewall 171 to the outer sidewall 172. The inner sidewall 161 of the protrusion 160 may face the inner sidewall 171 of the receptacle 170. The outer sidewall 162 of the protrusion may face the outer sidewall 172 of the receptacle 170.

In other examples, the receptacle may have a substantially L-shape to receive the protrusion and to restrict the radial movement of the first bearing component towards a center of the roller pitch bearing. In these examples, the receptacle may comprise an outer sidewall extending substantially parallel to the outer sidewall of the protrusion.

In FIG. 4, one or more gliding pads 150 are arranged between the outer sidewalls 162 and 172 of the protrusion and the receptacle. Alternatively, or additionally, one or more gliding pads may be arranged between the inner sidewalls 161 and 171.

The gliding pads arranged between the engaging portions may reduce friction between them. In addition, vibrations of the bearing components may be absorbed by the gliding pads.

Figure 5:
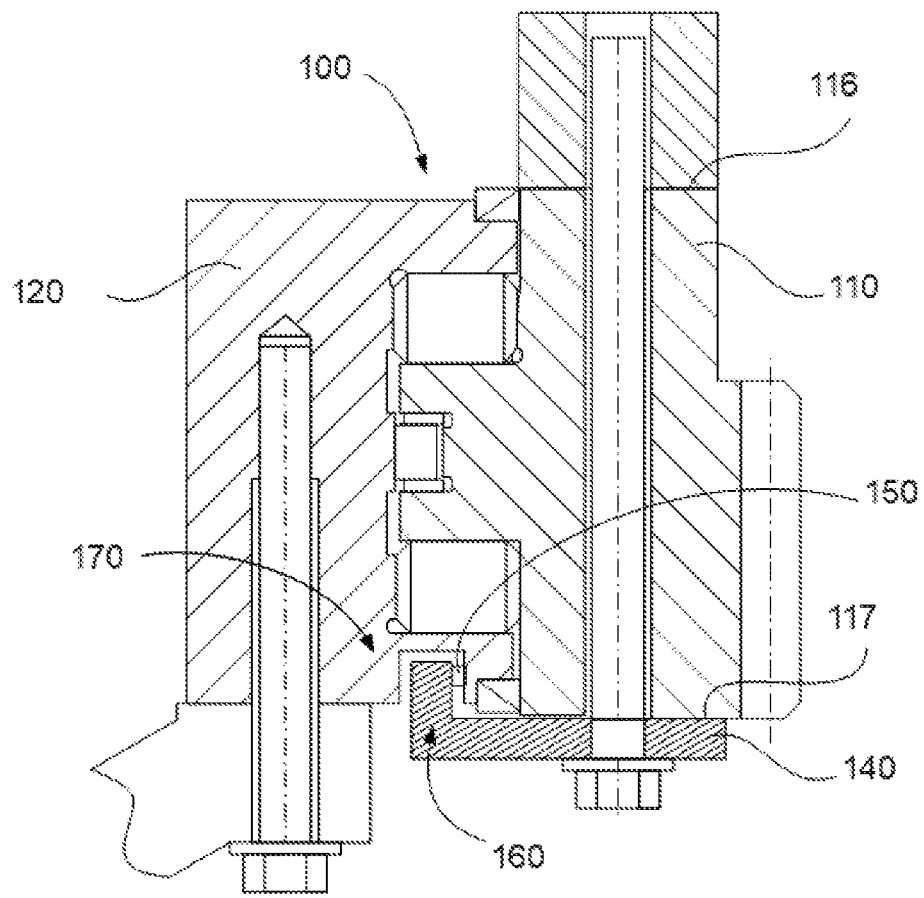
FIG. 5 shows a cross-sectional view of a portion of a roller pitch bearing for a wind turbine according to one example of the present disclosure.

FIG. 5 shows a cross-sectional view of a portion of a roller pitch bearing for a wind turbine according to one example of the present disclosure. The roller pitch bearing of this example is similar to the roller pitch bearing depicted in FIGS. 3 and 4. However, in FIG. 5, the engaging portion of the limiting structure 140 is a protrusion 160 and the engaging portion of the second bearing component 120 is a receptacle 170. The receptacle 170 may be a recess extending along the circumference of the second bearing component 120. The protrusion 160 may be partially arranged inside the internal space of the receptacle 170. The receptacle 170 may thus surround the protrusion 160.

In this figure, one or more gliding pads 150 are arranged between the inner sidewalls of the receptacle 170 and the protrusion 160. In addition, one or more gliding pads may be arranged between the outer sidewalls of the receptacle 170 and the protrusion 160. In this example, inner sidewall refers to the sidewall of the receptacle 170 or of the protrusion 160 closer to the first bearing component 110. And, outer sidewall refers to the sidewall of the receptacle 170 or of the protrusion 160 closer to the second bearing component 120.

In the example of FIG. 5, the limiting structure 140 is attached to the first bearing component 110 at the lower side 117 of the first bearing component 110. In other examples, the limiting structure may be attached to the upper side 116 of the first bearing component. In further examples, one limiting structure may be arranged at the upper side and another limiting structure at the lower side.

Figure 6:
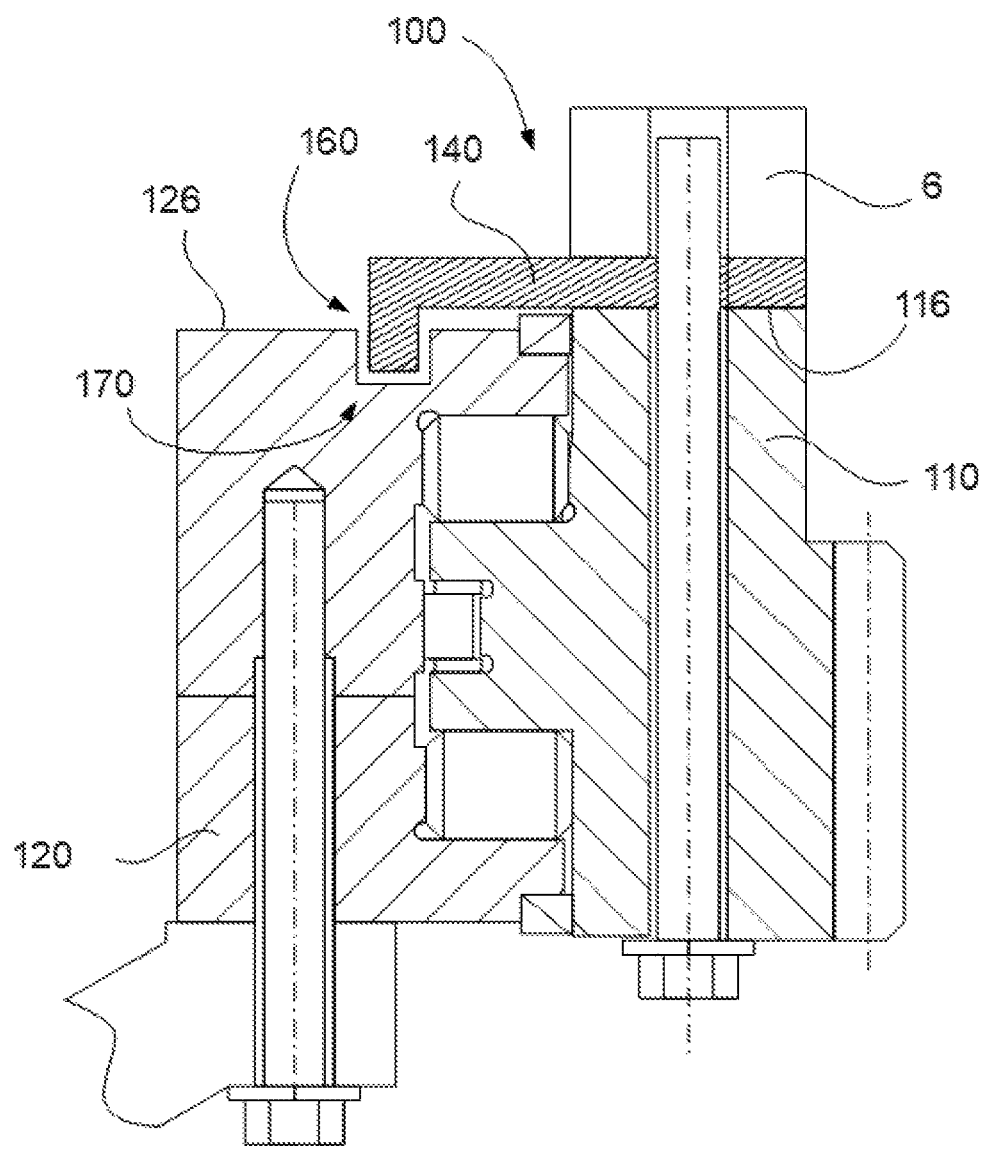
FIG. 6 shows a cross-sectional view of a portion of a roller pitch bearing for a wind turbine according to one example of the present disclosure.

FIG. 6 shows a cross-sectional view of a portion of a roller pitch bearing for a wind turbine according to one example of the present disclosure. The roller pitch bearing 100 of this figure is similar to the roller pitch bearing of FIG. 5. However, in FIG. 6 the limiting structure 140 is attached to the upper side 116 of the first bearing component 110. The upper side 116 of this example faces the wind turbine blade 6. A portion of the limiting structure 140 may be clamped between the upper side 116 and the blade 7.

Like described with respect to FIG. 5, the engaging portion of the limiting structure 140 is a protrusion 160 and the engaging portion of the second bearing component 120 is a receptacle 170. The receptacle 170 may be a recess extending along the circumference of the second bearing component 120. In this example, the receptacle is arranged at the upper side 126 of the second bearing component 120.

In this example, the second bearing component is formed by an upper and a lower portion. Assembling the pitch bearing may be easier. In other examples, the second bearing component may be integrally formed.

Although not shown in this figure the roller pitch bearing may comprise one or more gliding pads arranged between the receptacle 170 and the protrusion 160 according to any of the examples herein described.

Figure 7:
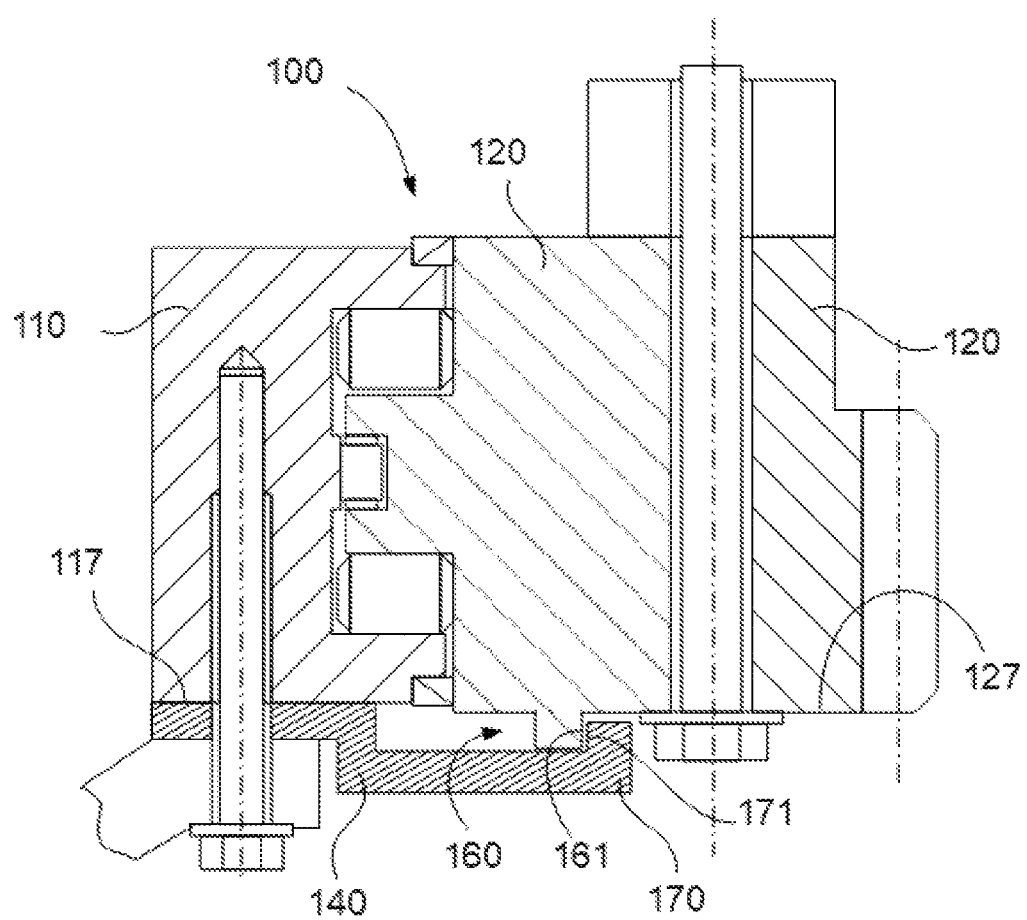
FIG. 7 shows a cross-sectional view of a portion of a roller pitch bearing for a wind turbine according to one example of the present disclosure.

FIG. 7 shows a cross-sectional view of a portion of a roller pitch bearing for a wind turbine according to one example of the present disclosure. The roller pitch bearing 100 of this figure comprises a first bearing component 110 and a second bearing component 120. The first bearing component 110 is configured to rotate with respect to the second bearing component 120.

In this example, the first bearing component 110 is an outer ring and the second bearing component 120 is an inner ring. The first bearing component may thus be placed in a radially outer side and the second bearing component in a radially inner side of the roller pitch bearing.

The roller pitch bearing 100 of this figure comprises a limiting structure 140 attached to the first bearing component 110. In this particular example, the first bearing component is connected to the rotor hub. The limiting structure 140 extends from the first bearing component 110 towards the second bearing component 120, i.e. towards a center of the roller pitch bearing.

A plurality of bolts may connect the rotor hub to the first bearing component. The limiting structure 140 may be clamped between the rotor hub 6 and the first bearing component 110. The limiting structure 140 may be connected to a lower side 117 of the first bearing component 110. The lower side 117 of the first bearing component 110 may face the rotor hub 6.

In other examples, the limiting structure may be attached to an upper surface 116 of the first bearing component. In some of these examples, bolts connecting the rotor hub to the roller pitch bearing may be used to connect the limiting structure to the first bearing component. In other examples, dedicated fasteners may be used to connect the limiting structure to the first bearing component.

The limiting structure 140 of this example comprises an engaging portion which engages with an engaging portion of the second bearing component. In this example, the engaging portion of the limiting structure is a receptacle 170. The receptacle of this figure has a substantially L-shape. In some examples, the receptacle may have a substantially U-shape. The engaging portion of the second bearing component 120 is a protrusion 160. The protrusion 160 may extend axially from the lower side 127 of the second bearing component 120. In some examples, the engaging portions may be according to any of the examples described with respect to FIGS. 3 and 4.

In other examples, the engaging portions may be according to any of the examples described with respect to FIG. 5. The engaging portion of the limiting structure may be a protrusion and the engaging portion of the second bearing component may be a recess to receive the protrusion of the engaging portion.

In these examples, radial movements of the second bearing component 120 with respect to the first bearing component 110 may thus be limited. The limiting structure may thus prevent the separation of the second bearing component (associated with the blade) from the first bearing component (associated with the hub). In this respect, the inner sidewall 171 of the receptacle 170 may block a radial displacement of an inner sidewall 161 of the protrusion 160 towards a center of the circumference of the roller pitch bearing. Accordingly, the inner sidewall of the receptacle arranged at the limiting structure may prevent displacements of the second bearing component towards the center of the roller pitch bearing. In this example, gliding pads may be arranged between the inner sidewalls of the protrusion and of the receptacle to reduce friction between the inner sidewalls and to absorb vibrations of the bearing component associated with the blade.

In a further aspect, a rotor for a wind turbine is provided. The rotor comprises a rotor hub, a wind turbine blade and a roller pitch bearing. The roller pitch bearing may be according to any of the examples herein described.

The roller pitch bearing may rotatably connect the wind turbine blade to the rotor hub. The roller pitch bearing may comprise a first bearing component and a second bearing component, wherein the first bearing component is configured to rotate with respect to the second bearing component. One of the first and the second bearing components may be coupled to the wind turbine blade and the other one of the first and the second bearing components being coupled to the rotor hub.

For example, the first bearing component may be placed in a radially inner side and the second bearing component in a radially outer side of the roller pitch bearing. The first bearing component may be coupled to the wind turbine blade and the second bearing component may be coupled to the rotor hub. Alternatively, the first bearing component may be coupled to rotor hub and the second bearing component to the blade.

The roller pitch bearing may comprise a one or more rows of rollers arranged between the first and the second components according to any of the examples herein described.

In addition, the roller pitch bearing may comprise a limiting structure attached to the first bearing component. The limiting structure may radially extend from the first bearing component towards the second bearing component. An engaging portion of the limiting structure may engage with an engaging portion of the second bearing component to limit a radial movement between the bearing components. The engaging portions may be according to any of the examples herein disclosed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A roller pitch bearing for a wind turbine comprising:
a first bearing component engaged with an opposite second bearing component, the first bearing component being configured to rotate with respect to the second bearing component;
wherein the first bearing component is configured to be coupled to a wind turbine blade and the second bearing component is configured to be coupled to a rotor hub of the wind turbine;
one or more rows of rollers arranged between the first and the second bearing components;
a limiting structure separate from and attached to an end face of one of the first bearing component or the second bearing component, the limiting structure radially extending across an interface between the first and second bearing components towards the opposite bearing component, wherein the limiting structure comprises an engaging portion engaging with an engaging portion formed by the opposite bearing component to limit a radial movement between the bearing components; and
wherein the limiting structure is axially displaced from the rows of rollers at one of an upper side or a lower side of the first or second bearing component, the engaging portion of the limiting structure engaging with the engaging portion of the opposite bearing component radially inward or radially outward of all of the rows of rollers and radially between an outer diameter and an inner diameter of the roller pitch bearing defined by the engaged first and second bearing components.

2. The roller pitch bearing according to claim 1, wherein the first bearing component is an inner radial ring of the roller pitch bearing and the second bearing component is an outer radial ring of the roller pitch bearing.

3. The roller pitch bearing according to claim 1, wherein the first bearing component is an outer ring of the radial pitch bearing and the second bearing component is an inner ring of the radial pitch bearing.

4. The roller pitch bearing according to claim 1, wherein the roller pitch bearing comprises one or more gliding pads arranged between the engaging portions of the limiting structure and the second bearing component.

5. The roller pitch bearing according to claim 1 wherein one of the engaging portions comprises a protrusion and the other one of engaging portions comprises a receptacle to receive the protrusion.

6. The roller pitch bearing according to claim 5, wherein the receptacle and the protrusion comprise an inner and an outer sidewall, and wherein one or more gliding pads are arranged between the inner sidewalls.

7. The roller pitch bearing according to claim 5, wherein the receptacle and the protrusion comprise an inner and an outer sidewall, and wherein one or more gliding pads are arranged between the outer sidewalls.

8. The roller pitch bearing according to claim 1 wherein the limiting structure is attached to the lower side of the first or second bearing component.

9. The roller pitch bearing according to claim 1 wherein the limiting structure is attached to the upper side of the first or second bearing component.

10. The roller pitch bearing according to claim 1, wherein the limiting structure is substantially disc-shaped.

11. The roller pitch bearing according to claim 1, wherein the limiting structure is substantially disc-shaped and the receptacle extends along at least portion of a circumference of the limiting structure.

12. The roller pitch bearing according to claim 1, wherein the engaging portion of the limiting structure comprises a receptacle that bridges the interface between the first and second bearing components opposite to the limiting structure.

13. A roller pitch bearing for a wind turbine comprising:
a first bearing component to be coupled to a wind turbine blade;
a second bearing component engaged with the first bearing component, the second bearing component to be coupled to rotor hub of a wind turbine blade, wherein the second bearing component forms a protrusion;
one or more rows of rollers arranged between the first and the second bearing components in such a way that the first bearing component is configured to rotate with respect to the second bearing component;
a limiting structure separate from and attached to an end face of the first bearing component, the limiting structure radially extending from the first bearing component towards the second bearing component, wherein the limiting structure comprises a receptacle engaging with the protrusion formed by the first bearing component; and
wherein the limiting structure is axially displaced from the rows of rollers at one of an upper side or a lower side of the first bearing component, the receptacle engaging with the protrusion radially inward of or radially outward of all of the rows of rollers and radially between an outer diameter and an inner diameter of the roller pitch bearing defined by the engaged first and second bearing components.

14. The roller pitch bearing according to claim 13, wherein the first bearing component is placed in a radially inner side and the second bearing component in a radially outer side of the roller pitch bearing.

15. The roller pitch bearing according to claim 13, wherein the receptacle at least partially encloses the protrusion.

16. The roller pitch bearing according to claim 13, wherein the receptacle and the protrusion comprise an outer sidewall and an inner sidewall; wherein the outer sidewall of the receptacle faces the outer sidewall of the protrusion and the inner sidewall of the receptacle faces the outer sidewall of the protrusion.

17. The roller pitch bearing according to claim 16, wherein the roller pitch bearing comprises one or more gliding pads arranged between the inner sidewalls.

18. The roller pitch bearing according to claim 16, wherein the roller pitch bearing comprises one or more gliding pads arranged between the outer sidewalls.

19. A rotor for a wind turbine comprising:
a rotor hub;
a wind turbine blade;
a roller pitch bearing rotatably connecting the wind turbine blade to the rotor hub, wherein the roller pitch bearing comprises:
a first bearing component engaged with an opposite second bearing component, the first bearing component being configured to rotate with respect to the second bearing component;
wherein the first bearing component is configured to be coupled to a wind turbine blade and the second bearing component is configured to be coupled to the rotor hub;
one or more rows of rollers arranged between the first and the second bearing components;
a limiting structure separate from and attached to an end face of one of the first bearing component or the second bearing component, the limiting structure radially extending across an interface between the first and second bearing components towards the opposite bearing component, wherein the limiting structure comprises an engaging portion engaging with an engaging portion of formed by the opposite bearing component to limit a radial movement between the bearing components; and
wherein the limiting structure is axially displaced from the rows of rollers at one of an upper side or a lower side of the first or second bearing component, the engaging portion of the limiting structure engaging with the engaging portion of the opposite bearing component radially inward or radially outward of all of the rows of rollers and radially between an outer diameter and an inner diameter of the roller pitch bearing defined by the engaged first and second bearing components.

20. The rotor according to claim 19, wherein the first bearing component is placed in a radially inner side and the second bearing component in a radially outer side of the roller pitch bearing.

21. The rotor according to claim 19, wherein the engaging portion of the limiting structure comprises a receptacle that bridges interface between the first and second bearing components opposite to the limiting structure.

* * * * *